(No Model.)

F. BRUCKER.
SPRING HINGE.

No. 552,815.    Patented Jan. 7, 1896.

Attest
Walter Donaldson
J. L. Middleton

Inventor
Francis Brucker
by Ellis Spear
Atty.

UNITED STATES PATENT OFFICE.

FRANCIS BRUCKER, OF SHELBY, OHIO.

SPRING-HINGE.

SPECIFICATION forming part of Letters Patent No. 552,815, dated January 7, 1896.

Application filed May 15, 1895. Serial No. 549,345. (No model.)

*To all whom it may concern:*

Be it known that I, FRANCIS BRUCKER, a citizen of the United States, residing at Shelby, in the county of Richland and State of Ohio, have invented certain new and useful Improvements in Spring-Hinges, of which the following is a specification, reference being had therein to the accompanying drawings.

My invention relates to improvements in spring-hinges, and the object of the invention is to provide an extremely simple form of hinge in which the springs are not liable to become disarranged or broken, but which may, in case of accident, be easily and quickly replaced.

The invention is illustrated in the accompanying drawings, in which—

Figure 1:
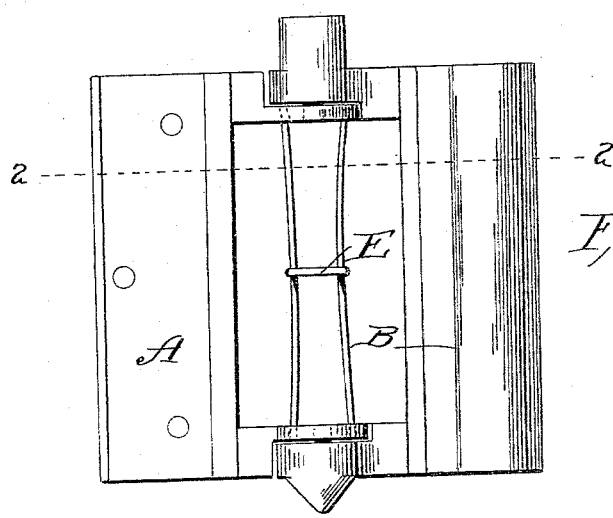
Figure 2:
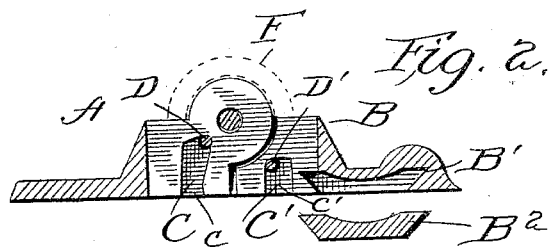
Figure 3:
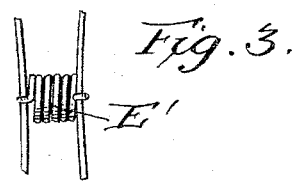

Figure 1 is a plan view of a hinge; Fig. 2, a cross-section on line 2 2 of Fig. 1, and Fig. 3 illustrates a modification.

In the drawings the two parts of the hinge are shown at A and B and may be of the ordinary construction, or one of the plates may be provided with a dovetailed recess B' arranged to be detachably connected with a corresponding plate B², whereby the door may be easily removed when desired without removing any screws. In the adjoining parts or sections of the hinge, at each end, are located the recesses C C', and into these recesses extend the ends of the rods D D', of spring material. Slots $c\ c'$ are provided leading from the recesses to the edges of their respective parts, whereby the rods may be removed and replaced. The rods are of spring material and are connected at their center by a link or double hook E. From the position of the recesses relative to the pivot of the hinge it will be seen that as the two parts of the hinge are moved out of line with each other the ends of the rods are separated, while the central portions are held by the link against further separation, thus producing the spring action. The amount of spring exerted will depend upon the size and elasticity of the rods and length of the link by which their centers are held.

Instead of using a link, as shown in Figs. 1 and 2, for connecting the centers of the rods a coiled spring E' may be used having hooked ends for hooking over the rods.

A suitable casing F may be provided for covering the spring parts, if desired.

From the above description it will be seen that a very simple and inexpensive form of spring-hinge is provided. The springs are not liable to break or become displaced; but in case of breakage the broken rod can be easily and quickly removed and a new one inserted.

Having thus described my invention, what I claim is—

1. A spring hinge comprising the two plates pivotally connected together, a spring rod carried by each section, and a connection between the said rods, substantially as described.

2. A spring hinge comprising the two plates pivotally connected together, a single spring rod carried by each plate and detachably supported by its ends thereon, and a connection between the central portions of said rods whereby as the hinge is moved and the ends of the rods separated the central portions are held together to exert spring tension on the plates.

In testimony whereof I affix my signature in presence of two witnesses.

FRANCIS BRUCKER.

Witnesses:
D. W. CUMMINS,
B. FRANK LONG.